(12) United States Patent
Ddamulira

(10) Patent No.: US 10,160,887 B1
(45) Date of Patent: Dec. 25, 2018

(54) CURE SIGNALING ADHESIVE

(71) Applicant: W.F. Taylor LLC, Dalton, GA (US)

(72) Inventor: Robert Kintu Ddamulira, Chattanooga, TN (US)

(73) Assignee: W.F. Taylor LLC, Dalton, GA (US)

( * ) Notice: Subject to any disclaimer, the term of this patent is extended or adjusted under 35 U.S.C. 154(b) by 0 days.

(21) Appl. No.: 15/658,977

(22) Filed: Jul. 25, 2017

(51) Int. Cl.
| C09J 11/06 | (2006.01) |
| C09J 5/00 | (2006.01) |
| C09J 125/16 | (2006.01) |
| C09J 109/00 | (2006.01) |

(52) U.S. Cl.
CPC ............ *C09J 11/06* (2013.01); *C09J 5/00* (2013.01); *C09J 109/00* (2013.01); *C09J 125/16* (2013.01); *C09J 2409/00* (2013.01); *C09J 2425/00* (2013.01)

(58) Field of Classification Search
CPC ... C09J 11/06; C09J 125/16; C09J 5/00; C09J 109/00; C09J 2409/00; C09J 2425/00
See application file for complete search history.

(56) References Cited

U.S. PATENT DOCUMENTS

| 4,954,544 | A | * | 9/1990 | Chandaria | ............ | C08K 5/1535 |
| | | | | | | 524/111 |
| 5,425,824 | A | * | 6/1995 | Marwick | ............ | B29C 65/4835 |
| | | | | | | 156/330 |
| 5,567,753 | A | * | 10/1996 | Shuman | ............ | C09J 9/00 |
| | | | | | | 524/249 |
| 6,706,789 | B2 | * | 3/2004 | Ddamulira | ............ | C08K 5/01 |
| | | | | | | 524/186 |
| 2004/0012622 | A1 | * | 1/2004 | Russo | ............ | B44C 7/04 |
| | | | | | | 715/718 |
| 2015/0020965 | A1 | * | 1/2015 | Hibben | ............ | C08F 230/08 |
| | | | | | | 156/329 |

FOREIGN PATENT DOCUMENTS

WO    WO 2016081357 A1 *   5/2016   ......... C08G 59/4021

OTHER PUBLICATIONS

Kiichi, A., et al; Chemical Education Journal, 2009, vol. 13, No. 1, p. 1-7.*
Danner, H., et al; Applied Biochemistry & Biotechnology, 1998, p. 887-894.*

* cited by examiner

*Primary Examiner* — Robert S Jones
(74) *Attorney, Agent, or Firm* — Ditworth & Barrese, LLP

(57) ABSTRACT

An adhesive is provided that will automatically signal that it has cured a sufficient amount for objects, such as flooring, to be installed on the adhesive. The cure-signaling adhesive can be a one component high strength adhesive composition which can signal that it has cured a sufficient amount and developed sufficient viscosity and tackiness (pressure sensitivity) for flooring or other objects to be installed on the adhesive. The adhesive can be formulated to change pH during curing and to signal sufficient curing by including a color change pH indicator in the adhesive. The adhesive can be formulated to have low or substantially no VOC emissions and can be formulated with bio-sourced ingredients.

27 Claims, 1 Drawing Sheet

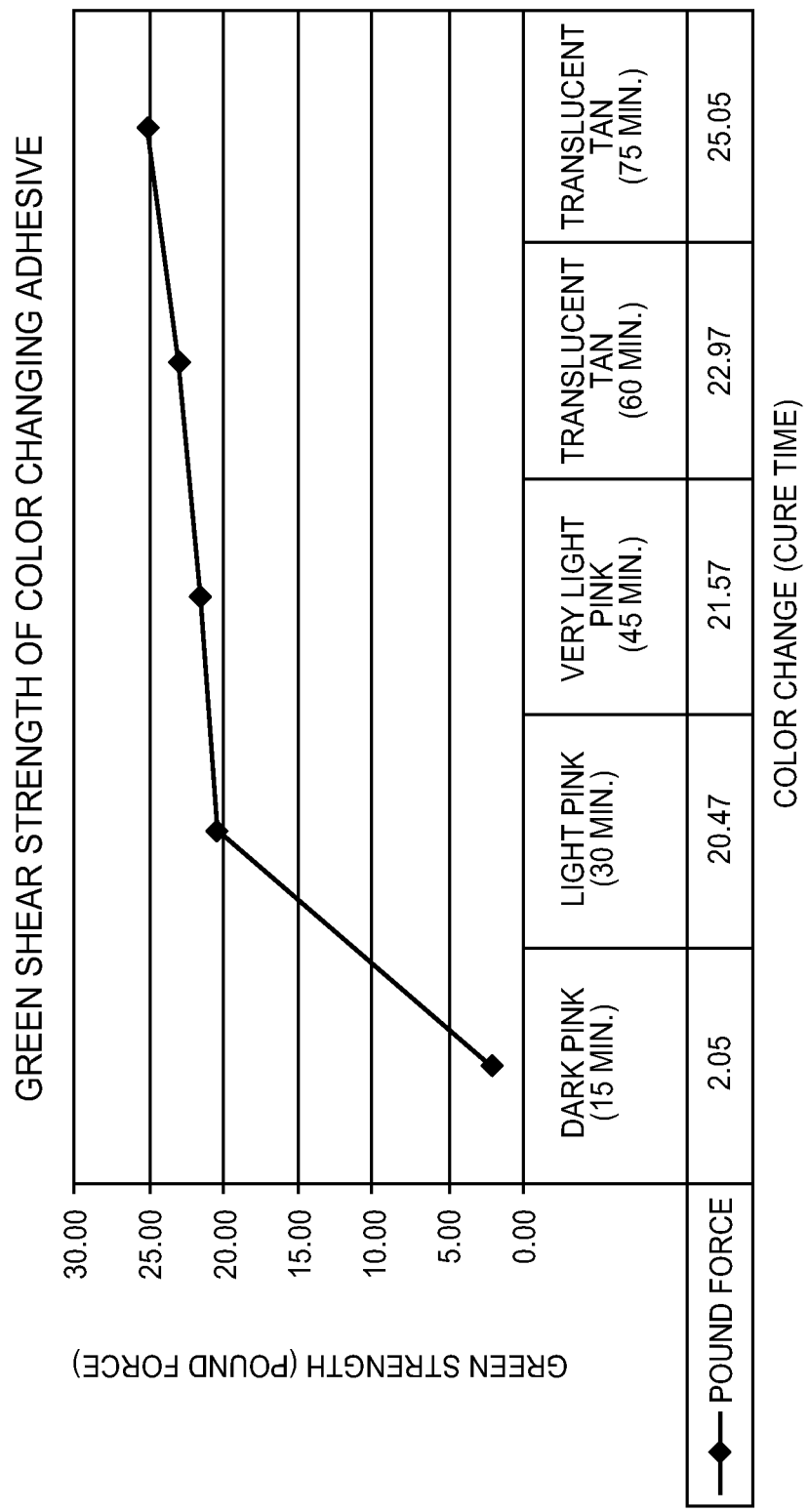

CURE SIGNALING ADHESIVE

BACKGROUND OF THE INVENTION

The invention relates generally to adhesives, such flooring adhesives, and more particularly, to adhesives that are applied wet and are permitted to dry a selected amount before they are used to adhere components, such as flooring and other objects.

Many constructions are assembled using adhesives. For example, various flooring products made from wood, vinyl, tile, carpet and so forth are permanently adhered to a surface or substrate through the use of an adhesive. Commonly used adhesives include those sold under the trademarks Taylor 2091 Vinyl Adhesive and Taylor 2071 Wood Adhesive, Taylor Enviotec 2090 Vinyl Adhesive and Taylor Envirotec 2055 Premium Carpet Adhesive, sold, by W.F. Taylor Co. of Fontana, Calif.

Single component adhesives can be convenient to use. However, it is often necessary to wait after application of the adhesive, to permit the adhesive to partially cure, before the object to be adhered (e.g., wood, tile, carpet) is applied. As curing begins, viscosity increases and tackiness, sometimes called "green strength," increases, to a point where it is preferred for the application of the flooring and the like. Ambient conditions can affect cure times. It is often difficult to determine whether the adhesive has cured sufficiently to apply the flooring or other object.

The solvents used in certain conventional solvent-based adhesives are believed by some to be undesirable. Many floor covering adhesives are made using fossil fuel based raw materials, which can be costly and cause environmental concerns. Many solvent-based adhesives emit Volatile Organic Compounds (VOCs). Depending on the working environment, available ventilation, and the amount of adhesive to be used, some consider the VOC's and other emitted chemicals to be disadvantageous.

Accordingly, it is desirable to provide an improved adhesive which overcomes drawbacks and inadequacies of conventional adhesives.

SUMMARY OF THE INVENTION

Generally speaking, in accordance with the invention, an adhesive is provided that will automatically signal that it has cured a sufficient amount for objects, such as flooring to be installed on the adhesive. The cure-signaling adhesive can be a one component, high strength adhesive composition which can signal that it has cured a sufficient amount and developed sufficient viscosity and tackiness (pressure sensitive adherence) for flooring or other objects to be installed on the adhesive. The adhesive can be formulated to change pH during curing and to signal sufficient curing by including a color change pH indicator in the adhesive. The adhesive can be formulated to have low or substantially no VOC emissions and can be formulated with bio-sourced ingredients. For example, adhesives in accordance with the invention can include polymers that are derived or extracted from renewable plant materials such as soybeans, corn, sunflowers, wheat, etc.

Cure signaling adhesives in accordance with the invention can be formulated as high solids, one-part, reactive, cross-linked adhesives. This can be achieved by employing amide-ester-acrylate reactions or reactions with any other carboxylated polymers. Adhesive compositions in accordance with the invention can include oils, such as various drying oils and similarly acting polymers, co-polymers, and fatty acids.

Adhesives in accordance with the invention can also include various hydrocarbon resins, particularly crosslinkable hydrocarbons having a melting point in the range 70° C. to 140° C. These can be dissolved or otherwise mixed in the drying oil component. For example, C-5 hydrocarbon resins formed from hydrocarbons having an average of about five carbon atoms in the backbone chain and C-9 hydrocarbon resins formed of hydrocarbons having an average of about 9 carbon atoms in the backbone chain and preferably both, mixed in effective proportions to provide desired cured strength, green strength, open working times and so forth can be satisfactory.

The composition can contain bio-based oils only, and can be free of fossil fuel or synthetic based oils. It can include drying oils and/or similarly acting polymers, co-polymers, and fatty acids. Plasticizers or fluidizing agents derived from renewable sources are utilized to impart performance properties to the formulated adhesive. Metal napthanates can be used to catalyze the drying and/or curing speed when the adhesive composition is applied to a substrate.

Adhesives in accordance with the invention can include fugitive alkali agents, such as ammonia, monomethanol amine (MEA) and triethanol amine (TEA). Cross linking agents, such as materials with pendant oxazoline groups, such as latex polymer emulsions which include those groups are also advantageously included. The presence of the fugitive alkali agents can prevent the adhesive from curing. After the adhesive is applied, these and moisture begin to evaporate. In the case of drying oils, oxygen is absorbed, hydrolysis can occur and fatty acids can be released. These curing reactions can effect two changes. The pH will become less basic and cross linking will begin. Thus, the drop in pH corresponds to the partial cure of the adhesive for flooring, etc.

High solids constructive adhesives in accordance with the invention can be particularly useful in assembling various flooring products made from wood, carpet, vinyl, ceramic, rubber to various substrates common to flooring installations including: concrete, plywood, underlayment grade particle board well bonded vinyl, ceramic tile, cement patches and underlayments, radiant heat flooring and terrazzo. Adhesives in accordance with the invention can benefit from polymer emulsions with carboxyl functionality, polymer emulsion cross-linkers containing pendant oxazoline group are also advantageously employed. Other useful ingredients including tackifing hydrocarbon resins dissolved in drying oils; napthanates of metals such as cobalt, calcium, zirconium, and magnanese; fugitive bases for pH adjustment; and other stabilizing agents, such as fugitive anti-oxidants.

Acid-Base indicators (also known as pH indicators) are substances which change color with pH. They are usually weak acids or bases, which dissociate slightly when dissolved in water and form ions. The acid and its conjugate base have different colors. At low pH, the concentration of $H_3O^+$ is high and so the equilibrium position lies to the acid (left) side. The equilibrium solution has the color A. At higher pH, the concentration of $H_3O^+$ is lower and the equilibrium position lies to the basic (right) side and the equilibrium solution has color B. Color change indicators include Thymol Blue, Methyl Orange, Bromocresol Green, Methyl Red, Bromothymol Blue, Phenol Red, and Phenolphthalein. Those of ordinary skill in the art will be able to appreciate that the appropriate amount of indicator is a matter of preference to obtain a sufficiently noticeable color change without unduly coloring the adhesive. Also, the adhesive can be formulated with different initial pH levels. Some may have an initial pH as low as 8, whereas others might have a pH of 12 or higher. However, as pH levels rise, the adhesive becomes more caustic to work with. Thus, the pH corresponding to acceptable cure can vary with the formulation and be signaled with different indicators.

As used herein, a "change in color" includes a change in hue, such as from pink or blue to noticeably lighter pink or blue.

Accordingly, it is an object of the invention to provide an improved adhesive, an improved method of making an adhesive and an improved method of using an adhesive.

Still other objects of the invention will in part be obvious and will, in part be apparent from the specification. The invention accordingly comprises the composition of matter, the method of making a composition of matter and the method of using the composition of matter which will be exemplified in the compositions and methods hereinafter described, and the scope of the invention will be indicating the claims.

BRIEF DESCRIPTION OF THE DRAWINGS

For a fuller understanding of the invention, reference is had to the following description, taken in connection with the accompanying drawing, in which:

FIG. 1 is a graph showing the change of shear strength with time and color change during the curing of an adhesive in accordance with a preferred embodiment of the invention.

DETAILED DESCRIPTION OF THE PREFERRED EMBODIMENTS

The invention is directed to adhesive compositions and methods of making adhesive compositions which can include ingredients set forth below. The adhesives are based on cross-linkable polymers, including plant based, petroleum based and other polymers made with monomers made from rapidly renewable raw materials, that are formulated to signal the progression of crosslinking as curing progresses. In one embodiment of the invention, the adhesive is formulated to exhibit a change in pH, preferably a reduction in pH as crosslinking progresses. By including a color changing pH indicator in the adhesive formulation, for example, the color or hue of the adhesive will change as crosslinking progresses and the change in color/hue will signal the appropriate time for installing material on the adhesive. As will be evident to those of ordinary skill in the art, substitutions, omissions and additions will be possible in order to provide adhesives with customized selected properties. Thus, the pH range at which acceptable drying or tackification of the adhesive can vary with the formulation and be signaled by different indicators over different pH ranges.

It is important, in construction situations in which adhesive is used to assemble structures, to permit sufficient, but not too much curing of the adhesive, prior to application of the adhered substance. For example, it is preferred to apply a layer of flooring adhesive on a substrate, permit the adhesive to cure partially, to develop appropriate viscosity and pressure sensitive adhesive strength, prior to the installation of the flooring. The flooring is then applied and the adhesive is permitted to cure fully.

To use adhesives in accordance with the invention, the adhesive is applied to a substrate and permitted to partially cure. The adhesive will signal when it is cured sufficiently for the installation of flooring or other materials to be adhered. The adhesive can signal by color change, viscosity change, texture change, tackiness and the like, that it is ready to receive the materials (such as flooring) to be adhered. Then the material, such as flooring, is applied and the adhesive is permitted to fully cure.

In one embodiment of the invention the adhesive composition will have a first color in its manufactured, un-cured condition. This is the condition of the delivered adhesive, whether in a can, tube, drub or vat. The adhesive will have this color upon application (the "application color") and a second color upon partial curing. As the adhesive is permitted to dry, it forms a "dried film" that is suitable for installation of material (e.g., flooring) to the dried film of adhesive. This dried film condition has suitable viscosity and tackiness for installations.

To provide the desired color changing signal that the dried film has formed, the color changing adhesive includes a sufficient concentration of color changing pH indicator. The amount of indicator is typically low, less than 5%, and depending on the indicator, less than 3%. (All percentages herein are by weight). In one embodiment of the invention, during the curing process, moisture and/or solvents will leave the adhesive layer. In certain embodiments of the invention, this corresponds to an initiation of cross linking and a simultaneous reduction of pH. In certain embodiments of the invention, this corresponds to a pH change from about 11-12, to about 7-8. In other embodiments, the pH changes from about 8-9 to 6-7.

If Phenolphthalein is used (typically, 0.5-1.5%), the loss of an initial dark pink hue can signal appropriate curing. If Bromothymol Blue is used (typically 1.5-3.5%), the loss of a blue tint signals sufficient curing.

Acceptable pH indicators include thymol phthalein, alizarin yellow, thanoate, p-napthobanzein, cresol-red, thymol blue, 2,4,6 trinitrotoluene, metacresol purple, and phenolphthalein. Phenolphthalein indicates the presence of basic conditions. It is colorless under acidic conditions and changes to a pink magenta color at a pH range of about 8.0-12.0. Therefore, the reduction in pH corresponding to the initiation of cross linking at a pH of about 8 under certain formulations makes Phenolphthalein a preferred indicator.

When using phenolphthalein as the pH indicator, the color changing adhesive composition typically has a dark (depending on concentration) pink color upon application. Following exposure to the atmosphere, drying will initiate the creation of acidic reactive species that will initiate cross linking and simultaneously lower the pH of the adhesive layer. The pink will gradually lighten (change hue) and the adhesive will change to its natural color, which can be light tan or clear as the pH drops during the drying process. The change in color signals the degree of dryness necessary to form a pressure sensitive adhesive film with sufficient bond strength for the installation of the flooring material.

In one embodiment of the invention, a chart is provided with different color hues, to indicate the level of cure. The adhesive is applied and the color chart is checked periodically, When the color of the adhesive layer matches the color on the chart, installation can proceed with sufficiently partially-cured adhesive.

Adhesives in accordance with the invention can function as flooring adhesives and exhibit fully cured shear strengths of over about 40 psi, over about 70 psi, and even over about 90 psi. Installations are typically performed at green strengths of over 3-6 psi for pressure sensitive adhesives, and can be different for different types of adhesives.

Preferred adhesives in accordance with the invention can be formed with the following composition and change color when adopting the dried film condition.

TABLE 1

| Preferred Ingredient | Preferred Amount wt % | Preferred Process |
|---|---|---|
| 1 Drying Oils such as Linseed Oil, Tung Oil, Sunflower Oil, Blown and Heated-bodied Oil, Cashew Shell Oil, Castor Oil, Coconut Oil, Cotton Seed Oil, Fish Oil, Oiticica Oil, Rapeseed Oil, Safflower Oil, Sesame Oil Soybean Oil, Walnut Oil, Synthetic Oils, Tall Oil, Dicyclopentadiene Copolymers, Fatty Acids, Vinyltoluene Copolymers, Versadil 100, Versadil 101, and Versadil 200 | 4 to 10 | |
| 2 Aliphatic C-5 Hydrocarbon Resin with a softening point of between about 75° and 115° C., such as that produced from Acyclic Aliphatic monomers such as Cis 1,3 Pentadiene, Trans 1, 3 Pentadiene, 2-Methyl 2 Butene | 4 to 10 | |
| 3 Alkylated Aromatic C-9 Resin with a softening point of between about 100° and 140° C., produced from C-8 to C-10 monomers such as Styrene, Vinyl Toluene, Indene, Methyl Indene, Alpha Methyl Styrene. | 10 to 20 | Ingredient 2 and 3 are combined with Ingredient 1. Temperatures of between about 240° and 300° F. may be required to form a substantially homogenous solution. This homogenous solution should be held at between about 250° and 260° before being combined with the ingredients below. |
| 4 Surfactants, such as 6 to 10 mole ethoxylates of nonylphenols | 0.50 to 1.50 | Add ingredients 4 and 5 to ingredient 6 while mixing until uniform. |
| 5 Anti-foaming agents such as non-silicon anti-foaming agents | 0.05 to 0.10 | |
| 6 Polymer emulsions (advantageously high solids) with carboxyl functionality, such as Acrylic, Styrene Butadiene, EVA, VAE | 30 to 60 | Maintain the temperature of ingredient 6 to between 60° and 90° F. Add ingredients 4 and 5 while mixing until uniform. Then add the premixed ingredients 1,2 and 3 above to ingredient 6 with high shear agitation until ingredients form a homogenous emulsion. |
| 7 Fugitive anti-oxidants, Bactericide, Fungicides, and Freeze-Thaw Stabilizers | 0.10 to 1.00 | Add while agitating |
| 8 Fugitive alkali agent, such as Ammonia, MEA, TEA | 0.10 to 1.00 | Use the alkali to adjust the above emulsion pH to between 8-10 before adding ingredients 9 and 10 |
| 9 Dispersing Agent, such as salts of poly acrylic. acid | 0.10 to 1.00 | Add while agitating |
| 10 Napthanates of metals such as cobalt, calcium, zirconium., and manganese | 0.10 to 1.00 | Add while agitating |
| 11 Polymer emulsion with pendant oxazaoline groups | 1.00 to 7.00 | Add while agitating |
| 12 pH Indicator (Phenolphthalein, thymolphthalein, alizarin yellow, thanoate, p-napthobenzein, cresol red, thymol blue, , metacresol purple) | 0.001 to 6.00 | Add while agitating |
| 13 Fillers such as Calcium Carbonate, Kaolin Clay, Mica, Talc, etc. | 20 to 40 | Add slowly with high shear agitation |

Acceptable color indicators are set forth below in Tables 2 and 3. The amount of indicator is a matter of design choice, depending on the desired color, the chemistry of the indicator and the chemistry of the adhesive. Many indicators are weak acids or weak bases and the use of too much indicator can affect the chemistry of the adhesive. The indicator can be included as a few drops or more, typically 0.001% to 6%, preferably 0.1% to 3.5%, more preferably 0.5% to 3%, depending on the indicator. In an embodiment of the invention, a mix of indicators providing a range of color changes is used to signal different amounts of curing for different applications.

TABLE 2

| Indicator | Color | | pK$_{In}$ | pH range |
|---|---|---|---|---|
| | Acid State | Base State | | |
| Thymol Blue-1$^{st}$ change | red | yellow | 1.5 | 1.2-2.8 |
| Methyl Orange | red | yellow | 3.7 | 3.2-4.4 |
| Bromocresel Green | yellow | blue | 4.7 | 3.8-5.4 |
| Methyl Red | yellow | red | 5.1 | 4.8-6.0 |
| Bromothymol Blue | yellow | blue | 7.0 | 6.0-7.6 |
| Phenol Red | yellow | red | 7.9 | 6.8-8.4 |
| Thymol Blue-2$^{nd}$ change | yellow | blue | 8.9 | 8.0-9.6 |
| Phenolphthalein | colorless | magenta | 9.4 | 8.2-10.0 |

TABLE 3

| Indicator | Low pH color | Transltion pH range | High pH color |
|---|---|---|---|
| Gentian violet (Methyl violet 10B) | yellow | 0.0.-2.0 | blue-violet |
| Leucornalachite green (first transition) | yellow | 0.0.-2.0 | green |
| Leucornalachite green (second transition) | green | 11.6-14 | colorless |
| Thyrnol blue (first transition) | red | 1.2-2.8 | ellow |
| Thymol blue (second transition) | yellow | 8.0-9.6 | blue |
| Methyl yellow | red | 2.9-4,0 | yellow |
| Bromophenol blue | yellow | 3.0-4.6 | purple |
| Congo red | blue-violet | 3.0-5.0 | red |
| Methyl organge | red | 3.1-4.4 | yellow |
| Screened methyl orange (first transition) | red | 0.0-3.2 | grey |
| Screened methyl orange (second transition) | grey | 3.2-4.2 | green |
| Bromorresol green | yellow | 3.8-5.4 | blue |
| Methyl red | red | 4.4-6.2 | yellow |
| Azolitmin | red | 4.5-803 | blue |
| Bromocresol purple | yellow | 5.2-6.8 | purple |
| Bromothymol blue | yellow | 6.0-7.6 | blue |
| Phenol red | yellow | 6.4-8.0 | red |
| Neutral red | red | 6.8-8.0 | yellow |
| Naptholphthalein | colorless to reddish | 7.3-6.7 | greenish to blue |
| Cresol Red | allow | 7.2-8.8 | reddish-purle |
| Phenolphthalein | colorless | 8.3-10.0 | fuchsia |
| Thymolphthalein | colorless | 9.3-10.5 | blue |
| Alizarine Yellow R | yellow | 10.2-12.0 | red |

Adhesive compositions in accordance with the invention advantageously include liquids that can be used to dissolve and blend other ingredients, but which can be easily and readily oxidized and/or polymerized to transform into a hard, dry material after exposure to air. Examples of such material include relatively highly unsaturated oils and polymers, such as those identified above as drying oils. The drying oil component can be included as about 1 to 20%, preferably 4 to 10%, more preferably about 2% to 5%. By dissolving (mixing) the resins in the drying oil component and addition of fugitive anti-oxidants, they can be prevented from crosslinking until the drying oil is exposed to air and the drying oil hardens.

The cross linking initiates as the composition starts to dry and the fugitive anti-oxidant starts to evaporate. This can correspond to a reduction in basic material, an increase in acidic material and a reduction in pH. Thus, there should initially be sufficient anti-oxidant to prevent the composition from curing too quickly, and to provide sufficient open time and case of handling. Preferred open time should be about 30 to 60 minutes and depends on the desired application. The precise color change will depend on the curing/drying conditions, based on the composition, and will typically, but not always, begin after 20-30 minutes.

Adhesives in accordance with the invention can also include hydrocarbon resins. The resins are selected to give the cured adhesive the desired amount of cured strength. Appropriate selection of resins also affects the partially cured strength of the adhesive, referred to herein as green strength in the dried condition after color change (or other signal). For example, if the adhesive is used as a flooring adhesive, it is desirable that the uncured adhesive maintain the applied flooring in place with reasonable security so that tiles, for example, can be aligned properly and so that minor bumps and nudges do not require reseating and realignment of the flooring materials. Below is a comparison of typical green strength of Meta-Tec wood adhesive, compared to a Moisture Cure Urethane Adhesive. As can be seen, the Meta-Tec Adhesive has adequate green strength after even 15 minutes, but the Moisture Cure Urethane adhesive requires over an hour to develop over 1 psi of green strength. Typically, a green strength of over 3 psi is preferred and the color/hue change should be noticeable to coincide with a strength of at least about 3 psi.

| Cure Time | 15 Min (psi) | 30 Min (psi) | 45 Min (psi) | 60 Min (psi) | 3 Hour (psi) | 6 Hour (psi) | 16 Hour (psi) | 24 Hour (psi) |
|---|---|---|---|---|---|---|---|---|
| Meta-Tec Adhesive | 5 | 22 | 23 | 32 | 45 | 50 | 86 | 94 |
| Moisture Cure Urethane | 1 | 1 | 1 | 1 | 7 | 28 | 53 | 57 |

It has been determined that the fully cured strength and green strength of the adhesive can be related to the softening points of the resin material used in the adhesive composition. As used herein, softening point will refer to the temperature at which viscous flow of a material that does not have a definite melting point changes to plastic flow.

Resins in accordance with preferred embodiments of the invention generally have softening points between 75° C. and 140° C. It has also been determined that by mixing resins with different softening points, advantageous characteristics of each resin can be realized. For example, resins with a relatively low softening point, e.g., about 95-105° C. will often have up to 30-40% less green strength and cured strength than resins with a relatively high softening point in the range of e.g., 115-130° C. Softening point also affects processing and handling properties. If a softening point is too high, desired ingredients might be difficult to emulsify at temperatures needed for proper mixing.

In one embodiment of the invention, a resin formed with hydrocarbons having on average, 6 or fewer carbon atoms (C6 or lower) and a softening point preferably between 75° C. and 115° C. is combined with a relatively harder resin formed from hydrocarbons having an average of 7 or more carbon atoms (C7 or higher) and a softening point preferably about between 100° C. and 140° C. One preferred embodiment includes a mix of C5 and lower with C9 and higher resins.

In preferred embodiments of the invention, the relatively soft resin can be an aliphatic hydrocarbon resin formed of hydrocarbons having an average of about 5 carbon atoms. Advantageous resins can be formed from acyclic aliphatic monomers, such as cis 1, 3 pentadiene, trans 1,3 peantadien, and 2-methyl 2 butene and cyclopentadienes.

Adhesive compositions in accordance with the invention also advantageously include a relatively harder hydrocarbon resin, particularly one having a higher temperature softening point in the range of 100° C. to 140° C. In particular, alkylated aromatic resins, particularly those formed from hydrocarbons having an average of 8 to 10 carbon atoms, such as those produced from C-8, C-9 and C-10 monomers, such as styrene, vinyl toluene, indene, methyl indene, alpha methyl styrene. Particularly suitable C-9 resins include petroleum aromatic hydrocarbon resins having softening points in the range 100° C. to 135° C. These relatively harder resins are advantageously included as 10 to 20%, preferably 12% to 18%. Other suitable C-9 and C-5 Resins are described in the below chart.

| Manufacturer | C-9 Resins | C-5 Resins |
|---|---|---|
| Sartomer Company | Norsoene S115, | |
| Oaklands Corporate Center | Norsoone S125, | |
| 502 Thomas Jonas Way | Norsolena S135 | |
| Exton, PA 19341 | | |
| Neville Chemical Company | Nevchem 110 | LX-1200 |
| 2800 Neville Road | Nevchem 120 | LX-1200-130 |
| Pittsburgh, PA 15225 | Nevchem 130 | LX-2600-125 |
| | Nevex 100 | |
| Grenhall Chemicals Limited | Resin GC100, | |
| 7686 Bath Road, | Resin GC300, | |
| Mississuega, ON | Resin GC400 | |
| Canada L4T 1L2 | | |
| Hercules Inc. | Picco 5120 | Piccotac 115 |
| Resins Division | Picco 6115 | Piccotac B |
| Hercules Plaza | | |
| 1313 North Market Street | | |
| Wilmington, DE 19894 | | |
| Sunbelt Chemicals, Inc. | SB1000 | R100AS |
| 407 N. Cedar Ridge, Suite 230 | SB1100 | S105A |
| Duncanville, Texas 75116 | SB140ES | R100G |

When preparing adhesive compositions in accordance with the invention, the monomers used to make the low temperature resin component are advantageously provided in the drying oil component in about a 2:1 to 1:2, preferably 1:1 weight ratio. The mixture of ingredients 1 and 2 can then be advantageously heated to a temperature above the softening point of the high temperature resin, preferably in the range of 115° C. to 140° C. with mixing, to form a generally homogeneous combination. Care should be taken to insure that the composition is not too far over the softening points of the materials or it can be difficult to form an emulsion. Thus, after a homogeneous combination is achieved, the temperature can be reduced to a point ease of mixing is maintained, generally approximately 115° C. to 130° C.

Surfactants, such as 6 to 10 mole ethoxylates of nonylphenols can be included, advantageously in the range of less than 5% by weight, advantageously 0.5 to 1.5%.

It is also advantageous to include anti-foaming agents, in particular, non-silicon anti-foaming agents. These are advantageously included as less than about 0.5 weight percent, preferably 0.05 to 0.10 weight percent.

Ingredients 4 and 5 can be added to the following emulsion, while mixing thoroughly.

Adhesives in accordance with the invention also advantageously include polymer emulsion materials, particularly those having carboxyl functionality to provide enhanced adhesive properties, such as those having acrylic, styrene butadien, ethylene vinyl acetate copolymer (EVA) and vinyl acetate ethylene copolymer can be included as about 20 to 80%, preferably about 30 to 60%, more preferably about 35 to 55% of the composition. The emulsion should be maintained at a temperature of about 15 to 30° C. Ingredients 4 and 5 can then be added and mixed until uniform. Ingredients 1, 2 and 3 are then added with high shear agitation until the ingredients form a substantially homogeneous emulsion.

Compositions in accordance with the invention also advantageously include fugitive anti-oxidants, bactericides, fungicides and freeze/thaws stabilizers.

Compositions in accordance with the invention also advantageously include fugitive alkali agents, such as ammonia, monomethanol amine (MEA) and triethanolamine (TEA). This alkali agent can be useful to adjust the pH of the emulsion to at least 7, preferably between about 8 and 10 before the oxazoline containing component is added.

Adhesive compositions in accordance with the invention can also include up to 2%, preferably 2.1 to 1% dispersing agents, such as salts of polyacrylic acids and naphthanates of metals, such as cobalt, calcium, zirconium and manganese. These should be added with agitation.

Adhesive compositions in accordance with the invention also advantageously include oxazole containing materials, in particular, polymer emulsion materials that include pendant oxazoline groups. There should preferably be about a 1:1 mole ratio between carboxyl groups in the composition and oxide groups. If too much of these materials are added, it will lower the possible solids content. If too little is added there will be lower cross link density and a weak adhesive.

Suitable emulsions can be prepared in an alkaline aqueous medium with the aid of a surfactant. Alkaline conditions are preferably employed to prevent acid hydrolysis of the oxazoline ring discussed below. Thus, it is useful to employ an alkaline surfactant. It is also advantageous to increase the pH to over 7, preferably over 8, before the oxazoline containing materials is added to the adhesive composition.

Oxazolines are 5-membered heterocyclic compounds, having the general formula $C_3H_3NO$ and are frequently used in organic synthesis. Emulsions containing particles of an oxazoline-modified polymer containing pendant oxazoline groups are discussed in U.S. Pat. Nos. 4,474,923, 4,508,869 and 4,325,856, the contents of which are incorporated herein by reference. Preferred oxazolines have the following formula:

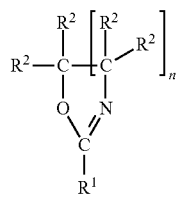

wherein $R^1$ is an acyclic or organic radical having addition polymerizable unsaturation; each $R^2$ is independently hydrogen, halogen or an inertly substituted, organic radical and n is 1 or 2. The oxazoline containing emulsion preferably also includes at least one other addition polymerizable monomer which is copolymerizable with the oxazoline and discrete particles of a coreactive polymer which coreactive polymer had been prepared in an emulsion polymerization process from (1) an addition, polymerizable coreactive monomer containing pendant groups which are capable of reacting with an oxazoline group to form covalent bonds thereto and (2) at least one other monomer which is copolymerizable with said coreactive monomer.

Adhesive compositions in accordance with the invention can also include fillers, such as calcium carbonate, kaolin clay, mica powder, talc and so forth. Fillers should generally represent less than 50% of the composition, preferable in the range of 20-40% of the composition. If too much filler is included the cohesive strength of the product can be reduced. If too little filler is included, the solids content will be too low.

These components should be added slowly, with high shear agitation, to ensure a substantially homogeneous mixture.

After adhesive compositions in accordance with the invention are deposited, the polymer emulsion containing the oxazoline groups becomes available to act as a crosslinking agent to cure the carboxylated polymers. Accordingly, a one component self-curing adhesive which can be made substantially or entirely free of VOCs can be achieved. These adhesives can include cure level indicators, such as acid/base indicators, to signal that a proper amount of cure has been achieved to begin the application of the desired materials, such as flooring.

Shear Strength (psi) at various cure times is provided for the following three non-limiting example adhesives. Example 1 is similar to Taylor 2091 pressure sensitive adhesive. It requires over 15 minutes to develop sufficient green strength and will change from dark to light pink at about that time. Examples 2 and 3 are similar to Tayor 2071 wood adhesive and will also change from dark pink to light pink after about 15 minutes.

| | 15 Min | 30 Min | 45 Min | 1 Hour | 3 Hour | 6 Hour | 16 Hour | 24 Hour |
|---|---|---|---|---|---|---|---|---|
| Example 1 | 4.3 | 11.6 | 26.2 | 29.8 | 45.3 | 50.3 | 86.6 | 94.0 |
| Example 2 | 4.1 | 20.7 | 23.3 | 29.4 | 38.9 | 43.2 | 81.5 | 89.1 |
| Example 3 | 4.9 | 21.7 | 23.3 | 31.5 | 45.3 | 50.3 | 85.7 | 94.0 |

| Application Devices and Application Rates | | |
|---|---|---|
| Installation Application | Trowel Size (width × depth × spacing) | Coverage (square feet per gallon) |
| Carpet or Wood | 3/32" × 3/32" × 3/32" v notch | 100-120 |
| Carpet | 1/8" × 1/8" × 1/16" v notch | 75-108 |
| Carpet | 1/8" × 1/8" × 1/16" u notch | 36-63 |
| Vinyl | 1/16" × 1/16" × 1/16" sq. notch | 150-180 |
| Vinyl | 1/16" × 1/32" × 1/32" u notch | 180-250 |
| Wood | 1/8" × 1/8" × 1/8" sq. notch | 60-80 |
| Wood | 3/16" × 3/16" × 3/16" sq. notch | 30-40 |
| Wood | 3/16:" × 1/4" × 1/2" V notch | 50-60 |

Adhesives in accordance with the invention can be formed with synthetic, oil based or natural materials. Recent advances in agro-gentic engineering and natural fiber development offer significant opportunities for new, improved green raw materials from renewable resources that are biocompatible and biodegradable thereby enhancing global sustainability. Examples of such materials include cellophane (cellulose based), cellulose derivatives such as cellulose esters, engineered wood products, biofiber composites, polylactic acid (PLA) Polymer from corn, starch foams, soybean based biodiesel and lubricants.

Preferred bio-based ingredients, preferred percentages of components in accordance with preferred embodiments of the invention are set forth in the Table 4 below:

TABLE 4

| | Preferred Ingredient | Preferred Amount wt % | Preferred Process |
|---|---|---|---|
| 1 | Drying Oils such as Linseed Oil, Tung Oil, Sunflower Oil, Blown and Heated-bodied Oil, Cashew Shell Oil, Castor Oil, Coconut Oil, Cotton Seed Oil, Fish Oil, Oiticica Oil, Rapeseed Oil, Safflower Oil, Sesame Oil, Soybean Oil, Walnut Oil, Synthetic Oils, Tall Oil, Fatty Acids, or any blend of the above. | 15 to 30 | |
| 2 | Wood or Gum Rosin. This may be combined with the following at low percentages: Aliphatic C-5 Hydrocarbon Resin with a softening point of between about 75° and 115° C., such as that produced from Acyclic Aliphatic monomers such as Cis 1, 3 Pentadiene, | 10 to 20 | Ingredients 2 are combined with Ingredient 1. Temperatures of between about 240° and 300° F. may be required to form a substantially homogeneous solution. This homogenous solution should be held at between about 250° and 260° before being combined with the ingredients below. |

TABLE 4-continued

| Preferred Ingredient | Preferred Amount wt % | Preferred Process |
|---|---|---|
| Trans 1, 3 Pentadiene, 2-Methyl 2 Butene, Alkylated Aromatic C-9 Resin with a softening point of between about 100° and 140° C., produced from C-8 to C-10 monomers such as Styrene, Vinyl Toluene, Indene, Methyl Indene, Alpha Methyl Styrene. | | |
| 3 Surfactants, such as 6 to 10 mole ethoxylates of nonylphenols and other emulsifying agents such as saponified esters. | 0.50 to 1.50 | Add ingredients 3 and 4 to ingredient 6 while mixing until uniform, |
| 4 Anti-foaming agents such as non-silicon anti-foaming agents | 0.05 to 0.10 | |
| 5 Polymers derived from plant and animal renewable sources with carboxyl, acrylic, methacrylate, epoxide functionality, such as acrylated epoxidized soybean oil polymers (AESO), maleinized soybean oil monoglyceride (SOMG), soy proteins, acrylated oleic methyl ester (AOME), polylactic acid (PLA), etc. These can be combined (at low levels) with synthetic polymer emulsions, such as Acrylic, Styrene Butadiene, EVA, VAE | 10 to 60 | Maintain the temperature of ingredient 5 to between 60° and 90° F. Add ingredients 3 and 4 while mixing,t, until uniform. Then add the premixed ingredients 1, and 2 above to ingredient 6 with high shear agitation until ingredients form a homogenous emulsion. |
| 6 Plasticizer from renewable sources such as hydrogen oxide | 20 to 50 | Add while agitating |
| 7 Fugitive alkali agent, such as Ammonia, MEA, TEA | 0.10 to 1.00 | Use the alkali to adjust the above emulsion pH to between 8-10 before adding ingredients 9 and 10 |
| 8 Dispersing Agent, such as salts of polyacrylie acid and phosphates etc. | 0.10 to 1.00 | Add while agitating |
| 9 Napthanates of metals such as cobalt, calcium, zirconium, and manganese | 0.10 to 1.00 | Add while agitating |
| 10 pH Indicator (Phenolphthalein, thymolphthalein, alizarin yellow, thanoate, p-napthobenzein, cresol red, thymol blue, , metacresol purple) | 0.001 to 6.00 | Add while agitating |
| 11 Fillers such as Calcium Carbonate, Kaolin Clay, Mica, Talc, Silica etc. | 20 to 40 | Add slowly with high shear agitation |

The drying oil component can be included, about 5 to 40%, preferably 10 to 35%, more preferably about 15% to 30%, by weight of the total composition. The drying oil component can help to achieve the desired viscosity. It can also serve as a plasticizer and solvent to incorporate some of the solid ingredients.

Adhesives in accordance with the invention can also include tackifying rosins, particularly rosins having a softening point in the range of 70° C. to 140° C. Wood and gum rosins are examples of such rosins. The rosins are selected to give the cured adhesive the desired amount of cured strength. Appropriate selection of rosins also affects the partially cured dried film strength of the adhesive, often referred to as green strength. For example, if the adhesive is used as flooring adhesive, it is desirable that the uncured adhesive maintain the applied flooring in place with reasonable security so that tiles, for example, can be aligned properly and so that minor bumps and nudges do not require reseating and realignment of the flooring materials.

Rosins in accordance with preferred embodiments of the invention generally have softening points between 70° C. and 140° C. By mixing rosins with different softening points, advantageous characteristics of each rosin can be realized.

A plasticizer or fluidizing agent from renewable sources, such as hydrogen oxide, can also be included, advantageously in the range of 10 to 45% by weight, advantageously 20 to 35%. The plasticizer provides tack and adhesion properties to help bind the components to each other as well as to the surface of the area under construction.

Surfactants, such as 6 to 10 mole ethoxylates of nonylphenols can be included, advantageously in the range of less than 5% by weight, advantageously 0.5 to 1.5%.

It can also be advantageous to include anti-foaming agents, in particular, non-silicon anti-foaming agents. These are advantageously included at less than about 0.5 weight percent, preferably 0.05 to 0.10 weight percent.

Adhesives in accordance with the invention can also advantageously include polymers derived from plant and animal renewable sources, particularly those having carboxyl, acrylic, methacrylate, epoxide functionality, such as acrylated epoxidized soybean oil polymers (AESO), maleinized soybean oil monoglyceride (SOMG), soy proteins, acrylated oleic methyl ester (AOME), polylactic acid (PLA), to provide enhanced adhesive properties. The polymers can be advantageously included between 1 to 80 weight percent, preferably 10 to 60 weight percent.

Compositions in accordance with the invention can also advantageously include fugitive alkali agents, such as ammonia, monomethanol amine (MEA) and triethanolamine (TEA). This alkali agent can be useful to adjust the pH. The invention can include up to 2%, preferably 0.1 to 1% of fugitive alkali agent.

Adhesive compositions in accordance with the invention can also include up to 2%, preferably 0.1 to 1% dispersing agents, such as salts of polyacrylic acids and dryers, in particular napthanates of metals, such as cobalt, calcium, zirconium and manganese. The dispersing agent can also include phosphates, such as tetrasodium pyrophosphate (TSPP). The dryers should be included in an effective amount to catalyze the drying speed of the drying oil to a desired rate. The precise amount will depend on both the desired speed of cure and the particular composition of the adhesive.

Adhesive compositions in accordance with the invention can also include effective amounts of fillers, such as calcium carbonate, kaolin clay, mica powder, talc and so forth. Fillers should generally represent less than 50% of the composition, preferable in the range of 20-40% of the composition. If too much filler is included the cohesive strength of the product can be reduced. If too little filler is included, the solids content will be too low for many applications.

A non-limiting example composition is below listed in Table 5, including a preferred process of making such example composition. Trace amounts, e.g., 0.001 to 0.1% of acid/base indicator such as phenol phthalein can be added without affecting adhesive properties and will provide an indication of sufficient drying for application of flooring and other material.

TABLE 5

| | Preferred Ingredient | Preferred Amount wt % | Preferred Process |
|---|---|---|---|
| 1 | Soybean Oil | 15.50 | |
| 2 | Wood or Gum Rosin. | 10.8 | Ingredients 2 are combined with Ingredient 1. Temperatures of between about 240° and 300° F. may be required to form a substantially homogenous solution. This homogenous solution should be held at between about 250° and 260° before being combined with the ingredients below. |
| 3 | Surfactants, such as 6 to 10 mole ethoxylates of nonylphenols and other emulsifying agents such as saponified esters. | 0.50 | Add ingredients 3 and 4 to ingredient 6 while mixing until uniform. |
| 4 | Anti-foaming agents such as non-silicon anti-foaming agents | 0.08 | |
| 5 | Polymers derived from plant and animal renewable sources with carboxyl, acrylic, methacrylate, epoxide functionality, such as acrylated epoxidized soybean oil polymers (AESO), maleinized soybean oil monoglyceride (SOMG) etc. These can he combined (at low levels) with synthetic polymer emulsions, such as Acrylic, Styrene Butadiene, EVA, VAE | 10.32 | Maintain the temperature of ingredient 5 to between 60° and 90° F. Add ingredients 3 and 4 while mixing until unifomi. Then add the premixed ingredients 1, and 2 above to ingredient 6 with high shear agitation until ingredients form a homogenous emulsion. |
| 6 | Plasticizer from renewable sources such as hydrogen oxide | 29.7 | Add while agitating |
| 7 | MEA | 0.80 | Use the alkali to adjust the above emulsion pH to between 8-10 before adding ingredients 9 and 10 |
| 8 | TSSP | 0.10 | Add while agitating |
| 9 | Napthanates of metals such as cobalt, calcium, zirconium, and manganese | 0.20 | Add while agitating |
| 10 | Kaolin Clay | 32.0 | Add slowly with high shear agitation |

An example of an adhesive similar to the adhesive in Table 5 and similar to Taylor 2091 vinyl tile adhesive was prepared and troweled over a test substrate as discussed below. Then, after various wait times, a 2"×2" test piece with a 4 in² surface area was placed on the adhesive layer and pressed with a 50 lb roller. The adhesive strength was measured and the results are shown in FIG. 1. As can be seen, at 15 minutes, the color was still dark pink and green strength was only about 0.5 psi. However, by 30 minutes, green strength was over 5 psi and the color had changed to light pink, eventually turning the tan color of the uncolored adhesive.

As can be seen, the color change of dark to light pink coincided with the development of adequate green strength and hence, the color change signaled that acceptable pre-curing had occurred.

Color Changing
Adhesive Green
Strength Example

| Subfloor | cement board |
|---|---|
| | 1/16" × 1/32" × |
| trowel size | 1/32" |
| flooring | LVT Tile |
| contact area | 2" × 2" (4 in²) |
| roller weight | 50 lb. |

| Color | Adhesive pounds force |
|---|---|
| Dark pink (15 min.) | 2.05 |
| Light Pink (30 min) | 20.47 |
| Very Light Pink (45 min.) | 21.57 |
| Transihicent Tan (60 min.) | 22.97 |
| Transiluoorit Tan (75 min.) | 25.05 |

Another example of an adhesive exhibiting high shear strength and a color change at the dried film stage, is set forth below in Table 6.

TABLE 6

| | Ingredient | Amount wt % | Process |
|---|---|---|---|
| 1 | Drying Oil such as Linseed oil, Tung Oil, Sunflower Oil, Blown and Heated-bodied Oil, Cashew Shell Oil, Castor Oil, Coconut Oil, Cotton Seed Oil, Dicyclopentadiene Copolymers, Fatty Acids, Fish Oil, Oiticica Oil, Rapeseed Oil, Safflower Oil, Sesame Oil, Soybean Oil, Sythentic Oils, Tall Oil, Vinyltoluene Copolymers, Walnut Oil, Process Oil. | 4 to 10 | Blend ingredients that make up the aliphatic C-5 hydrocarbon resin with ingredient 1 (the drying oil) resulting in a mixture with a ratio of between 30:60 and 60:40. |
| 2 | Aliphatic C-5 Hydrocarbon Resin with a softening point of between 75° and 115° C., produced from Acyclic Aliphatic monomers such as Cis 1,3 Pentadiene, Trans 1,3 Pentadiene, 2-Methyl 2 Butene | 4 to 10 | |
| 3 | Alkylated Aromatic C-9 Resin with a softening point of between 100° and 140° C., produced from C8 to C-10 monomers such as Styrene, Vinyl Toluene, Indene, Methyl Indene, Alpha Methyl Styrene. | 10 to 20 | Ingredient 3 is dissolved in the above mixture (ingredients 1 and 2) at temperatures of between 240° and 300° F. to form a homogenous solution. |
| 4 | Surfactants, such as 6 to 10 mole ethoxylates of nonylphenols. | 0.50 to 1.50 | Ingredients 1 through 5 must be premixed and then heated and maintained at temperature between 240° and 260° F. |
| 5 | Non-Silicon Anti-foaming agents | 0.05 to 0.10 | |
| 6 | Latex Polymer with Carboxyl Functionality, such as Acrylic, Styrene Butadiene, EVA, VAE. | 30 to 60 | Pre-heat and maintain the temperature of ingredient 6 to between 60° and 100° F. Add the premixed ingredients above to ingredient 6 with high shear agitation until ingredients form a homogenous emulsion. |
| 7 | Fugitive anti-oxidants, Bactericide, Fungicides, and Freeze-Thaw Stabilizers | 0.10 to 1.00 | Add while agitating |

Stage one is the blending of the first 7 ingredients and storing (with constant slow agitation) the resulting mixture as a premix to be used in the final blend. Prior to blending the premix above with the rest of the ingredients below, the premix is cooled to a temperature of between 75° F. and 110°.

TABLE 6-continued

| Ingredient | Amount wt % | Process |
| --- | --- | --- |
| 8 Dispersing Agent, such as salts of poly acrylic acid. | 0.10 to 1.00 | Add while agitating |
| 9 Napthanates of metals such as cobalt, calcium, zirconium, and manganese | 0.10 to 1.00 | Add while agitating |
| 10 Fugitive alkali agent, such as Ammonia, MEA, TEA | 0.10 to 1.00 | Use the alkali to adjust the above emulsion pH to between 8-10 before adding ingredient 13 |
| 11 pH Indicator (Phenolphthalein, thymolphthalein, alizarin yellow, thanoate, p-napthobenzein, cresol red, thymol blue, , metacresol ptuple) | 0.0010 to 6.00 | Add while agitating |
| 12 Fillers such as Calcium carbonate, Kaolin Clay, Mica, Talc etc | 20 to 40 | Add slowly with high shear agitation |
| 13 Latex polymer emulsion with pendant oxazoline groups | 1.00 to 7.00 | Add while agitating |

The final temperature of the batch must be cooled to a temperature of not more than 90° F., prior to packaging.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An adhesive composition suitable for use as a construction adhesive, comprising:
the combination produced by combining effective amounts and proportions of a cross-linkable hydrocarbon resin, a fugitive alkali agent or fugitive antioxidant, a cross linking agent, and an acid/base color change indicator;
wherein the combination is formulated to provide an adhesive composition that can be applied to a substrate and will have a first application hue, and cure to a shear strength of over 3 psi and have a noticeably lighter intermediate hue within 30 minutes, and which will cure on the substrate to provide an adhesive of shear strength over 40 psi and be effective as a flooring adhesive and change hue as it cures to signal that cross linking is progressing, from the intermediate hue to a lighter cured hue of the substantially cured adhesive.

2. The adhesive composition of claim 1, wherein the indicator is phenolphthalein or bromothymol blue.

3. The adhesive composition of claim 1, wherein the indicator is phenolphthalein, added as 0.5-1.5% of the composition.

4. The adhesive composition of claim 1, wherein the indicator is bromothymol blue, added as 1.5-3.5% of the composition.

5. The adhesive composition of claim 1, and comprising a color chart displaying the hue of the adhesive corresponding to the color of the intermediate hue for installing flooring material on the adhesive.

6. The adhesive composition of claim 1, wherein the adhesive is formulated as a one component adhesive.

7. The adhesive composition of claim 1, wherein the adhesive composition comprises a resin component comprising a C-5 hydrocarbon component and a C-9 hydrocarbon component.

8. The adhesive composition of claim 7, wherein the C-9 hydrocarbon comprises styrene, vinyl toluene, indene, methyl indene, or alpha methyl styrene.

9. The adhesive composition of claim 1, wherein the composition comprises linseed oil, tung oil or sunflower oil.

10. The adhesive composition of claim 1, comprising ammonia, monoethanol amine, or triethanol amine.

11. The adhesive composition of claim 1, comprising an oxime.

12. The adhesive composition of claim 1, comprising a metal napthanate.

13. The adhesive composition of claim 1, wherein the composition is formulated to substantially lack VOCs that are emitted during curing.

14. The adhesive of claim 1, comprising a drying oil component, which comprises about 1-20% of the composition.

15. The adhesive of claim 1, wherein the composition is formulated to change hue to the cured hue within 60 minutes.

16. An adhesive composition and color chart combination, comprising:
the combination produced by combining effective amounts and proportions of an oil; a hydrocarbon resin component; a fugitive alkali agent or anti-oxidant; a cross linking agent; and an acid/base color change indicator, to provide an adhesive that can be applied to a substrate and which will cure on the substrate and noticeably change from a darker to a lighter hue as it develops a strength of over 3 psi within 30 minutes and cure to a shear strength of over 40 psi; and a color chart depicting at least one hue and instructions explaining to apply flooring to the adhesive while the adhesive has the depicted hue.

17. The adhesive composition of claim 16, wherein the indicator is phenolphthalein or bromothymol blue and the color change is from a dark hue to a light hue.

18. The adhesive composition of claim 17, wherein the resin component comprises a C-5 hydrocarbon component and a C-9 hydrocarbon component.

19. The adhesive of claim 16, wherein the adhesive is formulated to exhibit an open time of 60 minutes.

20. The adhesive of claim 16, comprising a polymer derived from a plant or animal source, with carboxyl, acrylic, methacylate or epoxide functionality.

21. A method of constructing a floor, comprising applying a layer of the adhesive of claim 1 to a substrate, the adhesive having an application hue, waiting for the adhesive to change color to a predetermined working hue, which is lighter than the application hue, but darker than the hue of the cured adhesive, to signal a selected level of shear strength, then applying flooring material to the adhesive while it has the working hue and permitting the adhesive to cure, to adhere the flooring material to the substrate with the layer of adhesive.

22. The method of claim 21, wherein the color change is from pink to a lighter shade of pink or blue to a lighter shade of blue.

23. The method of claim 21, comprising the step of comparing the adhesive color to a color chart and waiting to adhere the flooring material until the color of the adhesive matches the color indicated in the chart.

24. An adhesive composition suitable for use as a construction adhesive, comprising: the combination produced by combining effective amounts and proportions of a crosslinkable hydrocarbon resin; a fugitive alkali agent or antioxidant; a cross linking agent; wherein the combination is formulated to provide an adhesive composition that can be applied to a substrate and which will cure on the substrate and signal, as it cures that cross linking is progressing and wherein the hue of the adhesive corresponds to a color chart, which associates the hue of the adhesive with a directive to apply flooring to the adhesive while the adhesive has an indicated hue.

25. The composition of claim 24, wherein signal is a change in hue.

26. The composition of claim 25, wherein the signal is the development of a noticeably lighter hue.

27. The method of claim 21, wherein the working hue is indicated on a chart and the flooring material is applied to the curing adhesive when the hue of the adhesive matches the hue indicated on the color chart.

* * * * *